United States Patent [19]
Righini et al.

[11] 4,345,815
[45] Aug. 24, 1982

[54] PERFECT GEODESIC LENS FOR WAVEGUIDES AND OPTICAL PROCESSOR OF UNIDIMENSIONAL SIGNALS EMPLOYING SAID LENS

[75] Inventors: Giancarlo Righini, Florence; Stefano Sottini, Vaglia; Vera Russo, Florence, all of Italy

[73] Assignee: Consiglio Nazionale Delle Ricerche, Italy

[21] Appl. No.: 63,594

[22] Filed: Aug. 3, 1979

[30] Foreign Application Priority Data

Aug. 7, 1978 [IT] Italy ............................... 9555 A/78

[51] Int. Cl.³ .............................................. G02B 5/14
[52] U.S. Cl. ................................................ 350/96.18
[58] Field of Search ..................................... 350/96.18

[56] References Cited
FOREIGN PATENT DOCUMENTS

1434457 5/1976 United Kingdom ............ 350/96.18

OTHER PUBLICATIONS

Righini et al., Geodesic Lenses for Guided Optical Waves, Applied Optics, Jul. 1973, pp. 1477-1481.

*Primary Examiner*—John K. Corbin
*Assistant Examiner*—Rodney B. Bovernick
*Attorney, Agent, or Firm*—D. Paul Weaver

[57] ABSTRACT

A geodesic lens for waveguides formed by four concentric zones, of which the two exterior ones, having an external radius a and b, are portions of a plane surface, the central zone, having a radius d, represents the actual lens, and the remaining zone, having an external radius c, is a connecting portion without discontinuities with the contiguous portions having an external radius respectively equal to d and b, said parameters a, b, d, having been selected according to the optical characteristics of the lens to be obtained, taking into account the formulae: focal length f=ab/(a+b), aperture=2d, linear magnification X=b/a (or X=a/b according to the position of the image with respect to the source).

6 Claims, 5 Drawing Figures

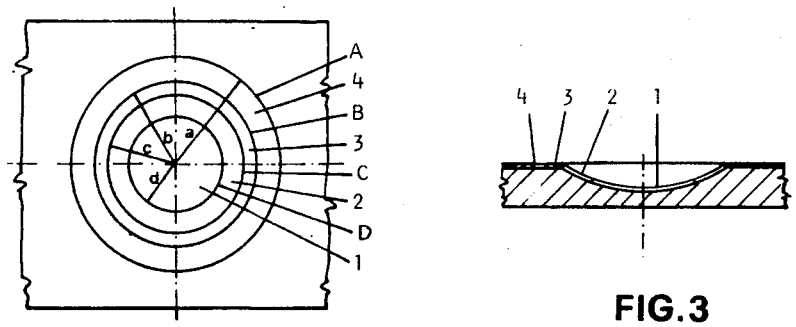
FIG.1
FIG.3
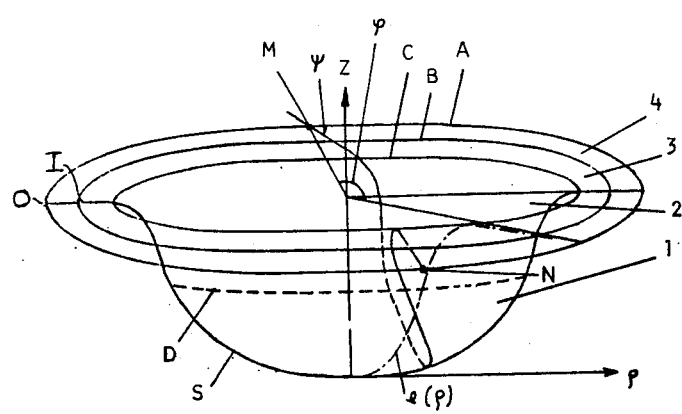
FIG.2
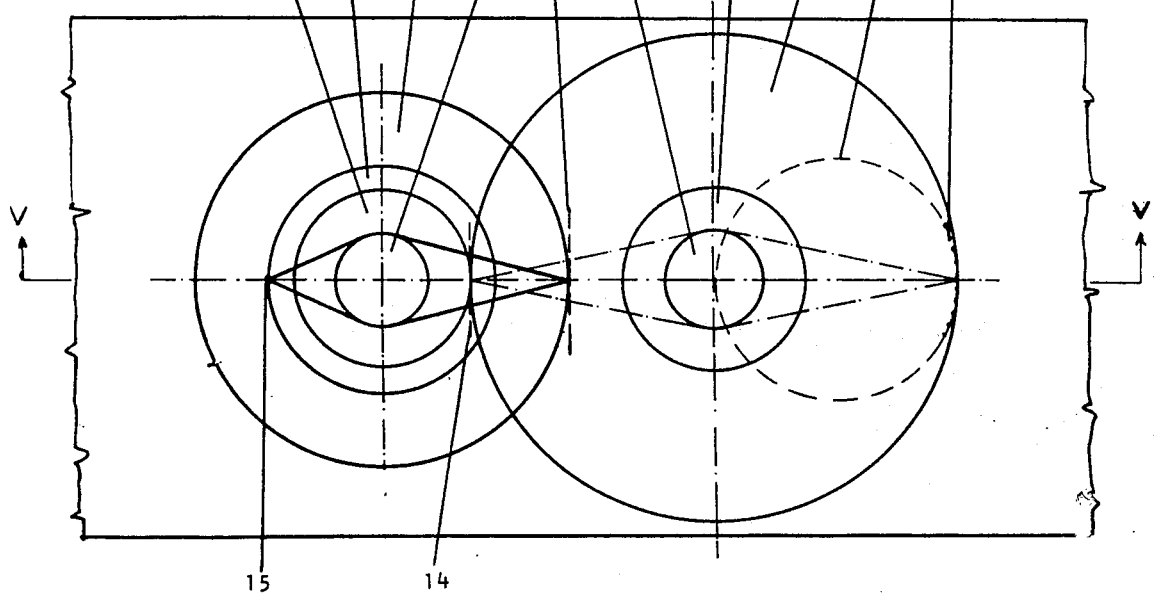
FIG.4
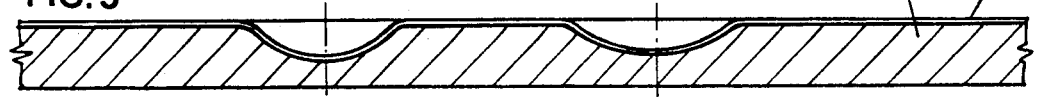
FIG.5

PERFECT GEODESIC LENS FOR WAVEGUIDES AND OPTICAL PROCESSOR OF UNIDIMENSIONAL SIGNALS EMPLOYING SAID LENS

BACKGROUND OF THE INVENTION

The present invention concerns a perfect geodesic lens for waveguides, and in particular for electromagnetic and surface acoustic waves, particularly suitable to be inserted in optical integrated circuits. (P. K. Tien: Integrated optics and new wave phenomena in optical waveguides. Reviews of Modern Physics, vol. 49, pages 361–420, April 1977).

The lens to which the present invention refers, pertains to the class of geodesic lenses and is formed by a substrate having a convenient non plane surface, but a convex or a concave one, on which the waveguide lies. (G. C. Righini, V. Russo, S. Sottini, G. Toraldo di Francia: Geodesic lenses for guided optical waves, Applied Optics, vol. 12, pages 1477–1481, July 1973). In the case of optical integrated circuits the waveguide is represented by a thin film of a generally dielectric material having a refraction index higher than that of the material forming the substrate. The substrate is generally a semi-conductor manufactured in glass or in special crystals through techniques peculiar to the optical field.

Geodesic lenses operate only according to curvature of the waveguide; the propagation in the thin film takes place according to the geodetics of the thus obtained bidimensional Rieman space. Any discontinuity in the guide, (as it occurs in the case of other types of lenses, due to variations in the thickness or the refraction index), is avoided.

The simplest geodesic lens is a portion of a spherical surface (a quarter of a spherical surface behaves as a perfect lens) but it shows a discontinuity at the input and at the output of the lens, which causes losses in the guide. It is well known that the aberrations of a portion of a spherical lens may be corrected by coupling the lens to a second lens of a different type (cf. for instance U.S. Pat. No. 3,917,384: High resolution lenses for optical waveguides). Problems of modal conversion, however, arise and the production complexities increase.

In the field of purely geodesic lenses, to obtain perfect and correct lenses, use has to be made of aspherical surfaces, of the revolution type, in order to avoid serious fabrication difficulties.

Still the problem connected with the discontinuities, or conflection lines, at the input and at the output, remains unsolved. The addition to the lenses of a toroidal junction, which would not affect substantially the properties of the lenses, has been considered. A better solution, however, to this problem is to foresee the continuity of the surface of the lens already in its design. This aim can be attained by applying the equivalence principle between lenses presenting a distribution of the refraction index (generalized lenses of Luneberg) and geodesic lenses. Following this principle a geodesic lens was actually obtained, the profile of which was the result of a numerical calculation: by approximation the lens was thus divided into a high number of rings (D. Kassai et al.: Aberration corrected geodesic lens for integrated optics circuits, Digest of technical papers, Topical Meeting on Integrated and Guided Wave Optics, Salt Lake City, Jan. 16–18, 1978).

A direct method is also known which brings an exact solution for the profile of geodesic lenses, perfect and without discontinuities, where the equivalence principle is not followed.

This method, which at an earlier stage was proposed for applications in the field of microwaves (G. Toraldo di Francia, Un problema sulle geodetiche delle superfici di rotazione che si presenta nella tecnica delle microode, Atti della Fondazione Ronchi, XII year, pages 151–172, 1957), has been adopted by the inventors of the present invention to manufacture geodesic lenses for integrated optical circuits.

The lenses which may be obtained according to this method are formed by two parts, linked up with continuity to each other. The inner one, which constitutes the actual lens, is contained within a parallel B of radius b, whereas the outer one, delimited by a parallel A of radius a, acts as a junction to the external plane surface of the lens. A guided collimated beam, having a maximum aperture equal to the diameter 2b, is perfectly focused, whereas the rays which do not cross B are not focused. Such type of lenses presents the drawback that its focus lies on a point parallel A, i.e. exactly at the limit between the plane surface and the concave or convex area of the lens.

The object of the present invention is to realize geodesic lenses, which not only are free from said limitations, i.e. can perfectly focus a collimated beam at any predetermined point in the plane external to the lens depression, but, very importantly, they also are able to provide a perfect image (without aberrations) of a linear or point source placed at finite distance from the lens axis in the plane external to the lens itself.

Such an object, according to the invention, is obtained with a geodesic lens for waveguides characterized in that it is formed by four concentric zones, of which the two outer ones, having an external radius a and b, are portions of a plane surface, the central zone, having a radius d, represents the actual lens, and the remaining zone, having an external radius c, is a connecting portion without discontinuity with the contiguous portions having an external radius respectively equal to d and b; said parameters a, b, d, having been selected according to the optical characteristics of the lens to be obtained, taking into account the formulae: focal length $f = ab/(a+b)$, aperture = $2d$, linear modification $X = b/a$ (or $X = a/b$, according to the position of the image with respect to the source).

According to the invention, the parameter a, which gives the distance of the source or of the image from the center of the lens, may tend towards the infinite ($a \to \infty$), the lens resulting in such a case is divided into three concentric zones, having respectively radius b, c and d.

Still according to the invention, the geodesic lens thus obtained may be employed in an optical processor of unidimensional signals, including:

an optical waveguide formed by a thin film of a material transparent to the laser radiation adopted and supported by a substrate made of a material having a refraction index inferior to that of the thin film;

an optical system, manufactured on said substrate, formed by two geodesic lenses, the first of which having parameters a,b,c,d and the second one having parameters a',b',c',d', in such a way that the distance between the centers of the two lenses be equal or greater than the sum of the radius c of the first lens and of the radius a' of the second one.

a modulator situated between the two lenses at a distance a' from the center of the second lens to insert the input signal along a line located perpendicularly to the axis which unites the centers of the two lenses.

a filter located on a line parallel to the input line, at a distance a from the center of the first lens, and detecting means located on a circle having a radius equal to the focal length f of the second lens and having its center in a point situated on the line passing through the centers of the two lenses, at a distance a'-f from the center of said second lens.

The present invention and its way of operating may be better understood, merely by way of example, with reference to the attached drawings, wherein:

FIG. 1 is a schematic plan view of a geodesic lens, according to the invention, divided into four concentric zones;

FIG. 2 is a perspective view of the four zones of the geodesic lens of FIG. 1;

FIG. 3 is a diametral cross-section of the lens of FIG. 1;

FIG. 4 is a schematic plan view of an optical processor of unidimensional signals, wherein two geodesic lenses are used, and FIG. 5 is a longitudinal cross-section of said processor, along line V—V of FIG. 4.

With reference to FIG. 1 the surface of the geodesic lens according to the invention is divided into four concentric zones, respectively indicated as 4,3,2,1, delimited by circumferences A, B, C, D having respectively radius a,b,c,d, connected to each other without discontinuity.

The determination of the lens surface, indicated in FIG. 2 under S, which constitutes the waveguide, may be done by generalizing theoretical considerations as the basis of the indicated particular case. In FIG. 2 consider the parallel circumference A having a radius a on said surface S: all points thereon are specified by their longitude $\phi$ with respect to the origin M. Given an arbitrary function $F(\psi)$, the surface S is defined in such a way that the guided rays which cross A in a point M with an angle $\psi$, cross A again in a point N of longitude $\phi = F(\psi)$ for each value of $\psi$. If on the function $F(\psi)$ and on the characteristics of S, non restrictive hypotesis are set up, the first derivative of the function $l\ (\rho)$ may be universally determined: it will represent the meridian curve of the surface S. Thus:

$$l'(\rho) = -\frac{a}{\pi} \int_0^{\arccos(\rho/a)} \frac{F'(\psi) \cos \psi}{\sqrt{a^2 \cos^2 \psi - \rho^2}} d\psi \quad (1)$$

wherein $F'(\psi)$ is the derivative of $F(\psi)$. By integrating again, the meridian curve may be obtained, represented, in cylindric coordinates, by the function $$z(\rho) = \int_0^\rho \sqrt{l'^2(\rho) - 1}\, d\rho \quad (2)$$

From these functions, the surface of the geodesic lens of FIG. 2, may be obtained, so far to the function $F(\psi)$ the following expression is assigned $$F(\psi) = \frac{\pi}{2} + \arcsin\left(\frac{a}{b} \cos \psi\right) + \psi \quad (3)$$

wherein a and b, as it is well known, are the radius of parallel circumferences A and B limiting the two external zones 4 and 3. Said zones are always represented by portions of a plane surface.

Still, to avoid conflictions (discontinuities), only the radius where $\psi \geq \psi'$ may comply with equation (3), i.e. the radius which penetrate into the central zone 1 of the lens, delimited by the parallel circumference D having a radius d, indicated with broken line in FIG. 2. Thus zone 1 is the actual lens, whereas the zone indicated under 2, comprised between the parallel circumferences D and C, respectively of radius d and c, acts as a connection between the actual lens and the plane surface which characterizes zone 3. Said connecting surface may be selected in an infinite number of ways, so far as it exists as a function $F(\psi)$, with $\psi \leq \psi'$; according to which equation (1) is complied with. Said $F(\psi)$ must also coincide with equation (3) in $\psi = \psi'$ and with the law of the plane ($F(\psi) = 2\psi$) when $0 \leq \psi \leq \arccos c/a$. It is also necessary that $F(\psi)$ varies continuously between these two values of $\psi$ and without infinites for its derivative.

The parallel circumferences A and B which limit the two exterior zones 4 and 3, are, respectively, the locus of the perfect images and of the relative point sources, and vice versa.

The FIG. 3 is a profile of the lens, obtained as a cavity, ground out from the substrate, on which lies the thin film 6, wherein the electromagnetic radiation is guided. Under 1,2,3,4 the four zones are again indicated, into which the lens is supposed to be divided, when the lens is designed.

Merely by way of a non limitative example of the amplitude of the method, the connecting surface 2 has been characterized by selecting a meridian curve $l(\rho)$ given by:

$$l(\rho) = \int_d^\rho -\left(1 + \frac{c^2 - \rho^2}{h^2}\right) d\rho \quad d \leq \rho \leq c$$

which in cylindrical coordinates, by using formula (2) can be written as $z(\rho)$ given by:

$$z(\rho) = \int_d^\rho \left[\left(\frac{c^2 - \rho^2}{h^2}\right)^2 + 2\frac{c^2 - \rho^2}{h^2}\right]^{\frac{1}{2}} d\rho \quad d < \rho < c \quad (4)$$

wherein h is a real parameter which depends upon the ratios $d/c = \sin \gamma_{12}$, $d/b = \sin \gamma_{13}$, and $d/a = \sin \gamma_{14}$, according to the expression:

$$h = c\sqrt{\frac{\pi - 2\gamma_{12} - \sin 2\gamma_{12}}{\gamma_{13} + \gamma_{14}}} \quad (5)$$

As a consequence, the connecting surface is more gradual when the value assigned to the parameter c is greater, once the parameters a, b, and d have been fixed. A further advantage of this connecting surface is the possibility of forming a pile of lenses, heaped the one on the other.

Thus defined, the shape of the lens with the exception of the central zone 1, a ray which has crossed A with an angle $\psi > \psi'$ will pass through a longitude $\psi$ in the zone comprised between A and D. Said longitude is the sum of the contributions $\phi_4$, $\phi_3$, $\phi_2$, corresponding respectively to the zones 4,3 and 2 of the lens. The same longitude has to be passed through again, for the sake of symmetry, when the ray comes back from the parallel circumferences D to A. As a consequence, the longitude the ray still has to pass in the central zone of the lens, under the parallel circumference D, to comply with equation (5), will be:

$$F(\psi_1) = F(\psi) - 2\phi_4 - 2\phi_3 - 2\phi_2 = (\pi/2) + \arccos \\ (d/a) \cos \psi_1 + \arcsin (d/b) \cos \psi' - 2(\phi_4 + \phi_3 + \phi_2) \quad (6)$$

Stating explicitly with the contributions $\phi_4$ $\phi_3$ $\phi_2$ it is possible to arrive directly at the line $l'(\rho)$ of the central zone 1 of the lens so far undefined: it is in fact enough to derive equation (6) and to substitute it in equation (1). We have:

$$l'(\rho) = -\frac{1}{2}\left(1 + \frac{c^2 - \rho^2}{h^2}\right) + \\ \frac{2}{\pi h^2}\sqrt{d^2 - \rho^2}\sqrt{c^2 - d^2} - \frac{1}{2\pi}\arcsin\frac{\rho^2 + b^2 - 2d^2}{b^2 - \rho^2} - \\ \frac{1}{2\pi}\arcsin\frac{\rho^2 + a^2 - 2d^2}{a^2 - \rho^2} + \\ \frac{\rho^2 - c^2}{\pi h^2}\arcsin\frac{\rho^2 + c^2 - 2d^2}{c^2 - \rho^2} \quad 0 \leq \rho \leq d \quad (7)$$

From the above, and recalling equation (2) it is easy to obtain the meridian curve in cylindric coordinates. We have:

$$z(\rho) = \int_0^\rho \left\{ \left[ -\frac{1}{2}\left(1 + \frac{c^2 - \rho^2}{h^2}\right) + \\ \frac{2}{\pi h^2}\sqrt{d^2 - \rho^2}\sqrt{c^2 - d^2} - \frac{1}{2\pi}\arcsin\frac{\rho^2 + b^2 - 2d^2}{b^2 - \rho^2} - \\ \frac{1}{2\pi}\arcsin\frac{\rho^2 + a^2 - 2d^2}{a^2 - \rho^2} + \\ \frac{\rho^2 - c^2}{\pi h^2}\arcsin\frac{\rho^2 + c^2 - 2d^2}{c^2 - \rho^2}\right]^2 - 1 \right\}^{\frac{1}{2}} d\rho \quad 0 \leq \rho \leq d \quad (8)$$

whereas if $d \leq \rho \leq c$, the (4) is valid, and if $c \leq \rho \leq a$ we have $z(\rho) = z(c)$.

Of course these functions are not characteristic of a single lens, but of an entire family of lenses, specified by the parameters a,b,c,d, and where h is given by equation (5).

The lens according to the invention operates in the following way: given a source O located on the parallel circumference A, the lens gives its perfect image in the point I on the parallel circumference B and vice versa, i.e. a source I located on the parallel circumference B gives a perfect image in the point O on the parallel circumference A.

In the particular case in which a tends towards the infinite, the source is at the infinite, i.e. we have an incident collimated beam and the latter is focused in the point I on the parallel B.

The radius a,b of parallel circumferences A,B may be selected without limitations, as the source and the image may be located in whichever point of the plan.

From what has been said it clearly results that the geodesic lens according to the present invention offers numerous advantages, among which:

the possibility of obtaining a perfect image (without aberrations) of point sources or an extended one, located on whichever parallel circumference of the plan external to the zone delimited by the parallel circumference C;

the possibility of selecting the location of the image on whichever parallel circumference of the same plan external to the zone delimited by the parallel circumference C;

the possibility of focussing the collimated beam originated from whichever point of the plan external to the zone delimited by the parallel circumference C;

the possibility of heaping equal lenses the one over the other.

To manufacture the above described lenses, it is possible to adopt methods peculiar to the production of optical aspherical surfaces. In fact a convexity or a concavity has to be obtained in a substrate of a given refraction index, having a rotation symmetry, the meridian curve of which is that one peculiar to the lens considered. On said substrate a thin film is ultimately realized, of an constant thickness, wherein the light is guided. Said guiding film must have a refraction index greater than that of the substrate.

Due to the absence of conflections (discontinuities) these lenses may be inserted without difficulty, in any type of optical integrated circuit, and their way of operating is independent from the nature of the substrate and of the thin layer, which is supposed to be homogeneous. As said lenses are based upon principles of geometric optics, they operate in a perfect way with radiations variously guided and of a different wavelength.

The lenses according to the invention may be advantageously utilized to realize an optical processor of unidimensional signals schematically illustrated, merely by way of example, in FIGS. 4 and 5.

The FIG. 4 is a schematic view of a particular embodiment of said processor wherein the first lens has to be considered as formed by four concentric zones, respectively indicated as 7,8,9 and 10. In particular the zones 9 and 10 are portions of a plane surface.

The second lens, instead, pertains to the type wherein the radius a'=b' according to the invention already described, and is therefore divided into three concentric zones only, respectively indicated as 11,12,13. The part 13 is a portion of a plan.

The input line for the signals to be processed is perpendicular to the axis which unites the centers of the two lenses, also designated as the optical axis of the system. Said line, indicated under 14, is located at a distance equal to the external radius of zone 8 of the first lens. In an embodiment of the invention, the insertion of the signal to be processed may be obtained by operating a convenient modulator of the guided converging beam which comes out from the lens. Said beam has its origin in a point source 15 (signal insertion point) located on the optical axis. The line where the spatial Fourier transform of the input signal is performed, signal output point 18, is parallel to the input line and tangent, on the axis, to the parallel circumference which delimites the zone 10 of the lens. On this line is located the filter point 16 which processes the input signal.

So far the second lens is concerned, it is located in such a way that line 14 becomes tangent to the parallel circumference of radius b', which limites the plane zone 13. Said lens, therefore, should the filter 16 be suppressed, would provide an image of the input signal, located on a circle 17, having a radius equal to the focal $f=b'/2$, and its center on the optical axis at a distance, from the center of the lens, equal again to $f=b'/2$. The detectors 18, which complete the device, have to be located along said line.

FIG. 5 is a longitudinal cross-section of the same processor. The substrate where the two depressions are ground is indicated under 19; together with the thin film 20, they constitute the two geodesic lenses. The electromagnetic radiation is guided within the film 20, having a refraction index higher than that of the substrate.

The advantages of the above described processor, reside in the fact that the lenses employed are connected in a continuous way to the plane surface of the remaining substrate, and do not affect at all the selection of the materials the substrate and the guiding film are made of. This facilitates in a conspicuous way the fabrication of the remaining parts of the device (modulators, detectors, filter). Moreover, due to the use of the lenses according to the invention, the processor becomes a compact one, having a size considerably smaller than the processors employing traditional lenses.

So far as the aberrations introduced by the optical system, it is to be noted that they have no importance whatsoever when a pulse response is expected; otherwise, with a convenient selection of the lenses parameters, the aberrations are contained, in almost every case, within largely tolerable limits.

We claim:

1. Geodesic lens for optical waveguides characterized in that it is formed by four concentric zones (4,3,2,1), of which the two external ones (4,3), having an external radius a and b, are portions of a plane surface, the central zone (1), having a radius d, represents the actual lens, and the remaining zone (2), having an external radius c, is a connecting portion without discontinuities with the contiguous portions (1,3), having the external radius respectively equal to d and b, said connecting zone (2) being described by its meridian curve $l(\rho)$, which can be arbitrarily chosen, provided that $l'(\rho)$ be continuous for $d \leq \rho \leq c$ and match with continuity the $l'(\rho)$ of the surface under the parallel of radius d for $\rho=d$ and the $l'(\rho)$ of the plane for $\rho=c$, said central zone (1) being described by its meridian curve $l(\rho)$, obtained by integrating the following formula:

$$l'(\rho) = -\frac{d}{\pi} \int_0^{\arccos(\rho/d)} \frac{F'(\psi) \cos \psi}{\sqrt{d^2 \cos^2 \psi - \rho^2}} d\psi$$

where $F'(\psi)$ is the derivative of the function $F(\psi)$ expressing the longitude travelled by a ray in the surface under the parallel d, said parameters a, b, d having been selected according to the optical characteristics of the lens to be obtained, taking into account the formulae: focal length $f=ab/(a+b)$, aperture $=2d$, linear magnification $X=b/a$ (or $X=a/b$, according to the position of the image (9) with respect to the source (10)).

2. Geodesic lens according to claim 1 characterized in that the external radius of the most external zone (4) tends toward the infinite ($a \to \infty$).

3. Geodesic lens according to claim 1 characterized in that the profile $l(\rho)$ of the connecting surface (2) is described by the formula:

$$l(\rho) = \int_d^\rho -\left(1 + \frac{c^2 - \rho^2}{h^2}\right) d\rho \quad d \leq \rho \leq c$$

wherein h is a parameter which depends from the ratios $d/c = \sin \gamma_{12}$, $d/b = \sin \gamma_{13}$ and $d/a = \sin \gamma_{14}$ according to the expression:

$$h = c \sqrt{\frac{\pi - 2\gamma_{12} - \sin 2\gamma_{12}}{\gamma_{13} + \gamma_{14}}}$$

4. Optical processor of unidimensional signals, including:

an optical waveguide formed by a thin film of a material, transparent to the laser radiation adopted, supported by a substrate made of a material having a refraction index inferior to that of the thin film;

an optical system, manufactured on said substrate, formed by two geodesic lenses according to claim 1 the first of which having parameters a,b,c,d and the second one having parameters a',b',c',d', in such a way that the distance between the centers of the two lenses be equal or greater than the sum of the radius c of the first lens and of the radius a' of the second one;

a signal insertion point along a line located perpendicularly to the axis which unites the centers of the two lenses, and situated, between the two lenses, at a distance a' from the center of the second lens;

a filter point located on a line parallel to the input line, at a distance a from the center of the first lens, and a signal output point located on a circle having radius equal to the focal length f of the second lens and having their center in a point situated on the line passing through the centers of the two lenses, at a distance a'-f from the center of said second lens.

5. Optical processor of unidimensional signals according to claim 4 characterized in that at least one of the two lenses pertains to the type with parameters $a \to \infty$, b,c,d.

6. Geodesic lens for waveguides characterized in that it is formed by four concentric zones (4,3,2,1), of which the two exterior ones (4,3), having an external radius a and b, are portions of a plane surface, the central zone (1) having a radius d represents the actual lens, and the remaining zone (2), having an external radius c, is a connecting portion without discontinuities with the contiguous portions (1,3) having an external radius respectively equal to d and b, said parameters a, b, d, having been selected according to the optical characteristics of the lens to be obtained, taking into account the formulae: focal length $f=ab/(a+b)$, aperture$=2d$, linear magnification $X=b/a$ (or $X=a/b$, according to the position of the image (9) with respect to the source (10), and the profile $z(\rho)$ of the connecting surface (3) is described by the formula:

$$z(\rho) = \int_d^\rho \left[\left(\frac{c^2 - \rho^2}{h^2}\right)^2 + 2\frac{c^2 - \rho^2}{h^2}\right]^{\frac{1}{2}} d\rho \quad c \geq \rho \geq d$$

wherein h is a parameter which depends from the ratios d/c=sin $\gamma_{12}$, d/b=sin $\gamma_{13}$ and d/a=sin $\gamma_{14}$ according to the expression:

$$h = c\sqrt{\frac{\pi - 2\gamma_{12} - \sin 2\gamma_{12}}{\gamma_{13} + \gamma_{14}}}$$

* * * * *